(12) United States Patent
Sadler

(10) Patent No.: US 7,004,588 B2
(45) Date of Patent: Feb. 28, 2006

(54) PLANETARIUM AND POINT LIGHT SOURCE FOR USE IN SAME

(75) Inventor: Phillip M. Sadler, Cambridge, MA (US)

(73) Assignee: Learning Technologies, Inc., Somerville, MA (US)

( * ) Notice: Subject to any disclaimer, the term of this patent is extended or adjusted under 35 U.S.C. 154(b) by 0 days.

(21) Appl. No.: 10/461,033

(22) Filed: Jun. 13, 2003

(65) Prior Publication Data

US 2004/0014012 A1 Jan. 22, 2004

Related U.S. Application Data

(60) Provisional application No. 60/399,060, filed on Jul. 27, 2002, provisional application No. 60/396,761, filed on Jul. 18, 2002.

(51) Int. Cl.
*G03B 21/26* (2006.01)
*G09B 27/04* (2006.01)
*G09B 27/06* (2006.01)
*G09B 27/00* (2006.01)

(52) U.S. Cl. .................. 353/28; 353/122; 434/284; 434/286; 434/287; 362/559

(58) Field of Classification Search ............... 434/286, 434/284–292; 353/43, 62, 95, 94, 23, 96, 353/24, 7, 9, 122, 28, 29; 362/554–556, 362/559; G09B 27/04, 27/06, 27/00
See application file for complete search history.

(56) References Cited

U.S. PATENT DOCUMENTS

| 4,020,568 A | * | 5/1977 | Tajima et al. ............... 434/286 |
| 4,776,666 A | * | 10/1988 | Kuehn et al. ............... 385/115 |
| 5,278,596 A | * | 1/1994 | Machtig ..................... 353/122 |
| 5,857,760 A | * | 1/1999 | Pelton ........................ 362/554 |
| 5,903,388 A | * | 5/1999 | Sedlmayr .................... 359/497 |
| 6,568,814 B1 | * | 5/2003 | Rodriguez et al. ........... 353/69 |
| 6,623,126 B1 | * | 9/2003 | Sekiguchi et al. ........... 353/62 |
| 6,698,900 B1 | * | 3/2004 | Young et al. ................ 353/79 |
| 2003/0151727 A1 | * | 8/2003 | Glent-Madsen et al. ...... 353/94 |

* cited by examiner

Primary Examiner—W. B. Perkey
Assistant Examiner—Andrew Sever
(74) Attorney, Agent, or Firm—David G. Conlin; William J. Daley, Jr.; Edwards, Angell, Palmer & Dodge LLP

(57) ABSTRACT

Featured is a portable planetarium device suitable for use in projecting clear bright images of stars, planets, and other celestial objects onto a curved viewing surface. The portable planetarium devices of the invention comprise a point light source generators, a light dispersing lens assembly, and an opaque enclosure having transparent domains surrounding the light dispersing lens assembly. Also featured is a portable point light source comprising a light source, a light collection element and a light conducting conduit suitable for use in providing high intensity light with a small cross-sectional area.

17 Claims, 3 Drawing Sheets

PLANETARIUM AND POINT LIGHT SOURCE FOR USE IN SAME

This application claims the benefit of U.S. Provisional Application(s) No(s).:

Application No(s).: 60/396,761 filed Jul. 18, 2002, 60/396,060, filed Jul. 27, 2002.

FIELD OF INVENTION

The present invention relates to a planetarium projector and to a light source capable of spreading a substantially homogeneous point light source over 180° of coverage with approximately uniform light intensity distribution into a hemisphere. In particular, the invention relates to a planetarium projector comprising a light generating assembly and a projection assembly optionally connected by a light-transporting conduit such as a fiber optic cable. The light source of the invention provides a small, bright, hemispherical point-source for planetarium projectors.

BACKGROUND OF THE INVENTION

Planetariums are useful instruments for the study of astronomy. Clear, bright images of stars and other celestial objects may be projected onto a hemispherical screen using large fixed planetariums. These large planetariums are suitable for use in dedicated applications such as museum auditoriums but are not practical for many educational settings such as schools and universities, for personal use or for any application where modest unit cost or planetarium portability is a desirable feature.

Several smaller planetarium projection devices have been disclosed as discussed in detail hereinafter. In general, the prior art have poor image quality, e.g., typically images are dim, fuzzy or a combination of both. Typically, portable planetariums have a light source such as a halogen or tungsten filament bulb housed within the enclosure of the projector. The heat generated by the light source inside the projector can create a thermal burn hazard for planetarium operator or audience members.

One planetarium device disclosed in U.S. Pat. No. 1,693,969, employs a central arc lamp to illuminate a multitude of flat slides with tiny holes that represent stars. As that patent is understood, each slide covers a section of the sky and is imaged with a separate projection lens on the surrounding dome.

Another planetarium design, disclosed in U.S. Pat. No. 2,827,827, uses a central light source to illuminate an enclosing shape with holes or small lenses for each star. The projection mask consists of a globe having pin holes through which light was projected onto a curved screen. The light source employed was an incandescent filament bulb. The '827 design also includes the use of a spherical reflecting mirror to reduce the apparent size of the light source. Although the spherical mirror is reported to reduce the apparent point size of the light source (thereby improving the contrast of stars projected by the device), the intensity of the light source is sacrificed such that the projected stars are difficult to view except in complete darkness.

U.S. Pat. No. 4,763,280 describes an image generation system suitable for projecting a computer-generated image onto a curved surface. The system employs a projector capable of processing a computer signal into a visual output and projecting the image generated onto a screen by passing the image through a wide-angle lens.

Most existing low-cost planetariums use tungsten halogen or gas-filled tungsten filament lamps to illuminate the interior of a hemispherical enclosure having one or more apertures through which light may pass. Filament lamps have the advantage of low cost, easy replacement, small size and substantially uniform coverage over a hemisphere. These lamps have the disadvantages of filament size cannot be reduced below about 0.7 mm, low brightness, short life, high temperatures posing a burn hazard, and low color temperature. Bulb geometry may produce internal reflections and different filament profiles when viewed from different directions. Stars may appear as circles, lines or rings from different viewing angles.

Miniature arc lamps are being used increasingly in computer projectors and offer the advantages of high brightness along with small arc sizes, high color temperature, and long life. Arc intensity per unit area is much higher than a tungsten filament lamp, but arc lengths are still longer (at 1.2 mm) than miniature tungsten halogen lamps. Notable disadvantages associated with miniature arc lamps include uneven hemispherical coverage, large size, high starting voltages, and high temperature. New arc lamps are smaller than older designs, but still are too large to be used in miniature, portable projectors such as the design disclosed in the '827 patent.

It is known in the art that the quality of stars and other images projected onto a viewing surface is directly proportional to the apparent size of the light source. Typically, prior art planetarium projectors were limited by the physical size of a filament or arc of the light source.

It thus would be desirable to provide a new device which is easy to use and capable of projecting clear bright images onto a curved viewing surface. It would be particularly desirable to provide a device that would be portable by one or two individuals and capable of projecting clear bright images of stars, planets and other celestial objects onto a curved viewing screen. Such portable planetarium devices preferably would be simple in construction and less costly than prior art devices.

SUMMARY OF THE INVENTION

The present invention provides a planetarium projector device that facilitates the projection of images such as stars, planets and other celestial objects onto a curved screen with modest unit cost, minimal operation effort and improved image intensity and clarity compared to earlier portable planetarium devices. The planetarium projector of the invention comprise a point light source generator, a light dispersing lens assembly, an opaque enclosure with transparent domains surrounding the light dispersing lens assembly, and a standard planetarium projection viewing surface. Planetarium projection devices of the invention may further comprise a light conducting conduit disposed between the point light source generator and the light dispersing lens assembly such that the point light source generator and the light dispersing lens assembly disposed within the enclosure are housed in separate units which are connected by the light conducting conduit while the planetarium is in operation.

The invention also provides point light source generators suitable for use in the planetariums of the invention produce a high-intensity light which is substantially uniform throughout the cross-section. In preferred embodiments of the invention, the planetarium projector is contained within a single housing such that the point light source generator, a spherical or cylindrical opaque enclosure with transparent domains, and a light dispersing lens assembly mounted within the enclosure are mounted within a single apparatus. Light generated by the point light generator is typically transmitted to the projector assembly through a light conducting conduit.

In other preferred embodiments of the invention, the point light source generator is mounted in one housing and the projector assembly comprising a spherical or cylindrical opaque enclosure with transparent domains and a light dispersing lens assembly mounted within the enclosure is mounted in a second housing. Light generated by the point light generator is transmitted to the projector assembly through a light conducting conduit. Although the point light source and projector assembly may be separated by any distance, preferably they are separated by less than 50 feet. More preferably the point light source and the projector assembly are separated by less than 40, 30, 25, 20, 15 or 10 feet. In particularly preferred embodiments, the light source and projector assembly are separated by 3 feet or less.

Preferred light source generators and light dispersing lens assemblies combine to generate a high intensity point light source having a small apparent cross-sectional area. More preferred devices comprise a point light source generator and a light diffusing assembly combination generating a point light source of at least 250 lumens and having a largest apparent dimension of 1 mm or less, more preferably of generating a point light source of at least 500 lumens and having a largest apparent dimension of 0.5 mm or less.

The apparent size of the light source as used herein is defined to refer to the size of light necessary to result in the projected images having the observed clarity. Although the apparent size may be larger or smaller than the actual size of the point light source, preferred embodiments of the present invention comprise a point light source, light dispersing lens assembly, and optionally a light conducting conduit capable of generating an apparent point light source which is smaller than the actual point light source.

Preferred planetarium projectors of the invention comprise a projector assembly and a point light source generator which are spatially separated by a light conducting conduit in order to facilitate portability and operation of the planetarium and to minimize the risk of thermal burns or exposure to high intensity light associated with the point light source generator.

In preferred embodiments, light conducting conduits suitable for use in the planetarium projectors of the invention include any conduit capable of transmitting light entering one end of the conduit to the opposite end thereof. Preferred conduits are those capable of conducting or transmitting at least about 50% of the light entering one end of the conduit to the other end of the conduit. Particularly preferred light conducting conduits include optical fibers such as single lumen fiber optic cables and bundled coherent cables, solid polymer fibers capable of conducting light, fluid piping and other hollow conduits which have a mirrored finish on the interior wall of their lumen and like articles capable of transmitting light.

The projector assembly typically comprises a light dispersing assembly and an opaque cylindrical or spherical enclosure having transparent domains representing stars and other celestial objects. Preferred enclosures, which are suitable for use in the planetarium devices of the invention, include cylindrical enclosures disclosed by in U.S. Pat. No. 4,178,701. Preferred light dispersing assemblies comprise one or more optical elements capable of spreading incident beams of light. For example, the light rays of an incident cone of light entering the optical elements of the light dispersing assembly with a cone angle $\theta$ are bent by the optical elements such that the exiting light rays form a broader cone of light having a cone angle $\theta'$, wherein $\theta'>\theta$. dispersing assembly. In that way, the present invention facilitates the resolution of images projected onto a screen which is highly superior to the resolution of images generated by conventional portable planetarium devices.

The present invention provides a superior device which allows an operator to project an image of stars and other celestial objects onto a curved, e.g., hemispherical, projection screen and which is easy to transport and set up for viewing in a variety of locations. Further, the device is inexpensive to build, easy to maintain and provides bright, sharp images when viewed in a variety of low light conditions.

In this way a bright, small, safe point light source can be used in a planetarium projector and a light conducting conduit such as a fiber optic cable can carry the light beam into the center of the planetarium projection device.

BRIEF DESCRIPTION OF THE DRAWINGS

For a fuller understanding of the nature and desired objects of the present invention, reference is made to the following detailed description taken in conjunction with the accompanying drawing figures wherein like reference character denote corresponding parts throughout the several views and wherein.

DESCRIPTION OF THE PREFERRED EMBODIMENT

Figure 1:
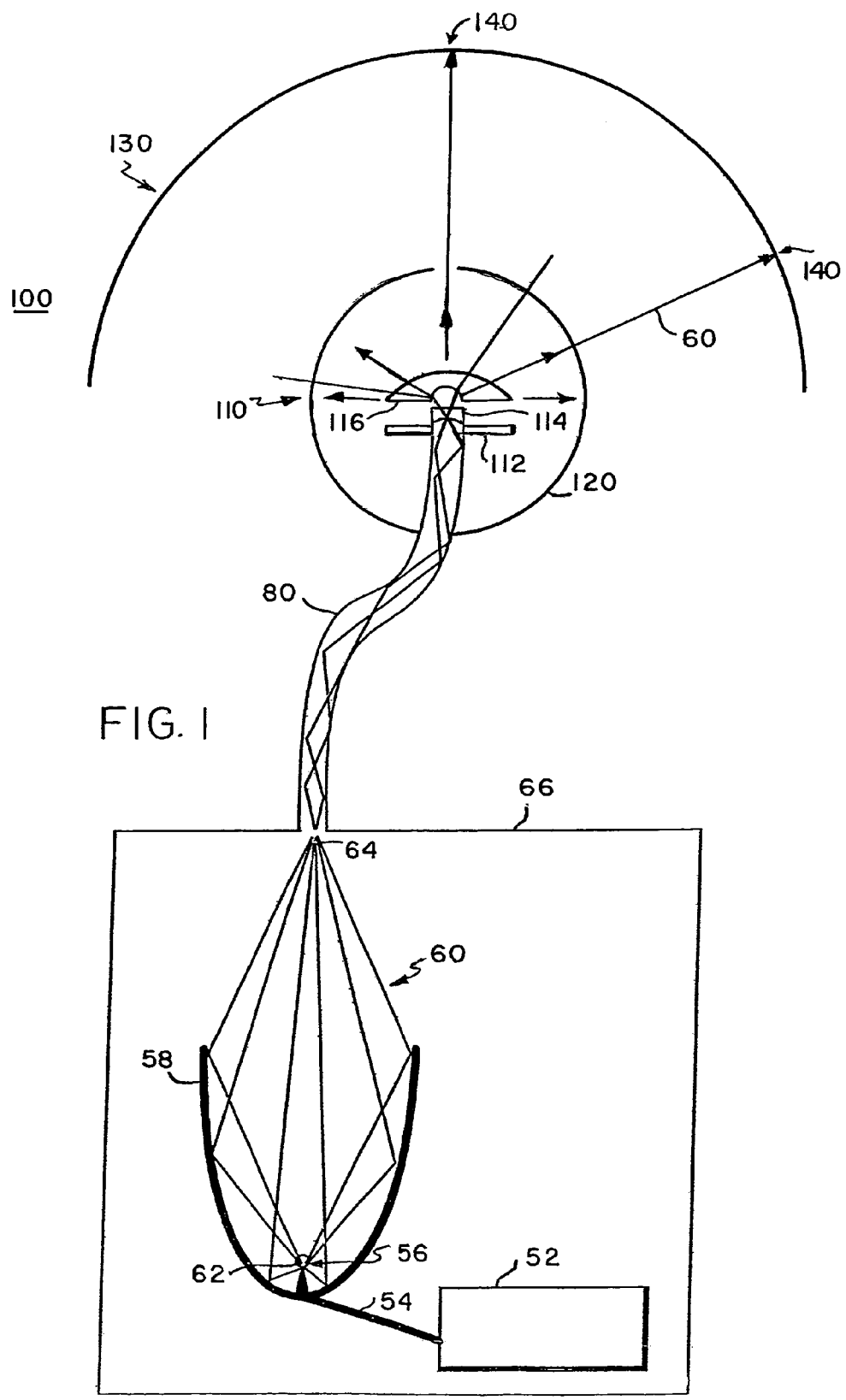
FIG. 1 is a schematic drawing of a planetarium of the invention comprising a point light source generator, a light conducting conduit, a projector assembly and a hemispherical projection screen.

Referring now to the various figures of the drawing wherein like reference characters refer to like parts, there is shown in FIG. 1 a portable planetarium 10 wherein a point light source is generated by a point light source generator, e.g., a lamp, 56 which is mounted at a focus 62 of an elliptical reflector 58. Light generated by the point light source generator 56 is reflected off of the elliptical reflector 58 and is directed to a second focus 64 of the ellipse defining the curvature of the elliptical reflector 58. The concentrated light rays are collected into a light conducting conduit 80 having a proximal opening disposed at or near the focus 64. The light is transmitted through the conduit 80 and exits through the distal end in a symmetrical cone of light having substantially uniform light intensity throughout the cross-section of the cone of light. The cone of light exiting the distal end of the light conducting conduit passes through one or more optical deflecting devices such as optical lenses or density gradient cylinders of a light dispersing lens assembly 110 which increases the angle of the light cone from about 90° to about 180° without reducing the homogeneity of the light intensity throughout the cross-section of the cone of light. In the process of dispersing the light over a larger cone angle, the apparent size of the point source of light is decreased.

The substantially homogeneous beam of light having a cone angle $\theta'$ exiting the light dispersing lens assembly impacts the inside surface of a spherical enclosure. The majority of the enclosure is opaque thereby blocking transmission of incident light. Certain regions of the enclosure representing stars, planets and other celestial objects are transparent such that incident light escapes from the enclosure in these transparent domains to be projected onto the projection screen.

The small holes in the enclosure act as a pinhole lenses focusing the image of the light source on a hemispherical projection screen. Brighter stars are imaged through larger holes and a small collimating lens. The central wide angle lens serves to reduce the apparent size of the end of the fiber, creating smaller star images with minimal reduction in brightness. In addition, reducing size of the exit aperture of the end of the fiber serves to reduce the size of the stars. This increases image quality of star images and affords the capability of matching star brightness to the changing level of dark adaptation of viewers.

Preferred point light source generators comprise a high-intensity light source, one or more light collection elements, a power supply, and a housing in which the components are mounted. Preferred housings further comprise an actuator for the power supply and at least one coupling to which a light conducting conduit may be attached. Alternatively, the housing comprises a coupling for reversibly attaching a light conducting conduit to the exterior of the point light source generator housing.

A high-intensity light source having a largest dimension of about 5 mm or less. More preferred high-intensity light sources suitable for use in planetariums of the invention have a largest dimension of about 4.0, 3.0, 2.0, 1.5, 1.0, 0.9, 0.8, 0.7, 0.6, 0.5, 0.4, or 0.3 mm or less. Particularly preferred high-intensity light sources have a largest dimension of less than about 0.5 mm or less. Preferred high-intensity light sources include plasma light sources such as high-intensity plasma arc lamps.

Particularly preferred plasma based high intensity light sources are powered by a power supply that is compatible with standard voltage and amperage available in most residential, industrial, and educational settings throughout the United States or Europe.

Preferred light sources include those light sources which are pre-assembled with a curved mirror such as an elliptical mirror or one or more optical elements to collect light emitted from the point light source. More preferred light assemblies include those which have the point light source generator disposed at a first focus of an elliptical mirror. Particularly preferred pre-fabricated light and collector mirror assemblies which are suitable for use in the planetariums of the invention include high-intensity arc lamps such as a Welch-Allyn M Series Solarc lamp with an elliptical reflector.

Other preferred light sources include those light sources which are pre-assembled with a plurality of spherical and/or paraboloid reflectors or lenses which are capable of concentrating light emitted from a point light source to another point in space. Particularly preferred are dual paraboloid reflector systems which typically comprise a dual paraboloid reflector having a point light source disposed at a first focus and a retroreflector situated to increase the amount of light reflected to a second focus of the dual paraboloid reflector. The retro reflector is typically the concave surface of a spherical mirror which is situated such that a substantial portion of the light emitted from the point light source in a direction away from the dual paraboloid reflector is reflected by the retro reflector through the first focus to strike the dual paraboloid reflector. Light from the point light source is then reflected by the dual paraboloid reflector to a second focus for collection in an optical conduit or in a light dispersing lens assembly. Particularly preferred dual paraboloid reflector system include the Wavien dual paraboloid system which is manufactured by Welch Allyn.

Typically, the light generated by the high intensity light source suitable for use in the devices of the invention is collected, harvested, concentrated or directed to a point in space. Preferred light collecting mechanisms include mirrors, preferably curved mirrors. Particularly preferred light collecting mechanisms include elliptical mirrors and dual paraboloid reflector systems wherein the high-intensity point light source is disposed at on focal point of the ellipse or dual paraboloid reflector such that substantially all of the light generated by the high-intensity point light source is reflected to the second focus of the elliptical mirror.

In certain embodiments of the invention, the elliptical reflector or dual paraboloid reflector system is heat absorbing or transparent to infrared radiation such that heat is dissipated evenly about the device instead of being concentrated at a second focus of the reflector or optical element. This keeps the end of the light conducting conduit disposed at or near the second focus sufficiently cool to prevent thermal damage to the light conducting conduit. Ultraviolet light can be absorbed by selecting the proper fiber material.

In preferred embodiments, the invention provides planetarium projectors comprising a light conducting conduit disposed between the point source light generator and the light dispersing lens assembly. Preferably, a proximal end to the light conducting conduit is disposed at or near the light source generator, e.g., is disposed at the second focus of the elliptical mirror or dual paraboloid reflector system, such that substantially all of the light passing through the second focus 64 enters into the sight conducting conduit. The distal end of the light conducting conduit is preferably disposed at or near the light dispersing lens assembly 110, such that light exiting the light conducting conduit impinges the light dispersing lens assembly.

Preferred light conducting conduits suitable for use in the invention are not particularly limited. Preferred light conducting conduits include fiberoptic cables, and other flexible cables capable of transmitting substantially all of the light entering the proximal end of the cable to the distal end of the cable.

Preferred planetarium projectors of the invention typically include a light conducting conduit capable of transmitting about 60%, 70%, 80%, 90%, 95% or substantially all of the light entering one end of the conduit from a point light source generator to the light dispersing lens assembly at the distal end. Preferred single lumen fiber optic cables suitable for use as light conducting conduits 80 have a cross-section of less than about 2 mm, more preferably have a diameter of less than about 1.75, 1.5, 1.25, or 1 mm. More preferred single lumen fiber optic cables suitable for use in light conducting conduits of the invention include those having a lumenal diameter of about 1 mm or less, more preferably having a lumenal diameter of about 0.9, 0.8, 0.7, 0.6, 0.5, 0.4, 0.3. 0.2, or 0.1 mm or less. Particularly preferred single lumen fiber optic cables have a lumenal diameter of about 0.5 to about 0.1 mm.

Typically, planetarium projectors of the invention comprising a single lumen fiber optical cable as the light conducting conduit 80 are at least about 2 times brighter than current technology, more preferably at least 3 times brighter or most preferably at least 4 times brighter than current planetarium technology. Particularly preferred conduits include any and all conduits suitable for use fiber optic applications including single strand glass fiber optic cables, bundled coherent fiber optic cables, and the like. In particularly preferred embodiments, the light conducting conduit comprise one or more fiber optic cables such as the Model A40-640 manufactured by Edmund Scientific or a comparable fiber optic product produced by Edmund Scientific or another manufacturer.

Coherent light bundles are suitable for use in certain preferred planetarium projectors of the invention. Light entering the proximal end of the center of a fiber optic exits the center of the distal end of the fiber optic cable. Coherent light bundles maintain the light intensity profile entering the bundle from the point light source upon exit of the light at the distal end of the coherent light bundle which is a desirable light property for certain embodiments of the invention. Planetariums comprising a coherent light bundle as the light conducting conduit are typically about 5, 10, 15 20, 25, 30, 35 or 40 times brighter than current planetarium technology. Preferred coherent light bundles include those bundles used in Edmund Scientific fiberscope A 53-134.

In preferred embodiments, light exits the light conducting conduit 80 in a cone having a cone angle of between 60° and 100°, more preferably 80° to 95°, or particularly preferably about 82 to 90°. In preferred embodiments of the invention, an iris is disposed between the distal end of the light conducting conduit and the light dispersing assembly which may be used to gate incident light entering the optical elements of the light dispersing assembly. Reducing the diameter of the interposing iris reduces cross-sectional area of the beam of light entering the light dispersing assembly such that the apparent size of the point light source is less than the size of the lamp 56 or the diameter of the light conducting conduit 80. The exiting cone of light then passes through one or more lenses or optical gradient cylinders of a light dispersing lens assembly 110 such that the incident cone of light is dispersed to a departing cone of light having a cone angle of about 150° or more, more preferably 160°, 170°, 175° or more, or about 180°.

Preferred lens assemblies include one or more fish-eye lenses, e.g., a wide angle lens, and may optionally include one or more convex lenses, concave lenses, or the like as are necessary to insure uniform light intensity throughout the dispersed cone of light. More preferred lens assemblies comprise a single fish-eye lens and optionally one or more concave or convex lenses. Typically any combination of concave or convex lenses combined with a single fish eye lens that functions to reduce the apparent cross-section of the point light source and create a uniform light intensity are suitable for use in the devices of the invention. More typically any concave or convex lenses are disposed between the light source and the fish-eye lens to ensure dispersion of the light source and a uniform light intensity throughout the dispersed light cone. Lenses suitable for use in light dispersing assemblies may include any combination of individual lenses or pre-assembled lens combinations. Preferred pre-assembled lens assemblies suitable for use in the devices of the invention include those composite lens assemblies which are suitable for wide-angle cameras, video recorders and the like.

A lens or lens assembly capable of dispersing light discharged from the light conducting conduit over a hemisphere, e.g., the light exiting the lens or lens assembly is dispersed to a cone of light having a cone angle θ' of about 180°. A preferred lens suitable for dispersing the light source over a hemisphere is a Edmund Industrial Optics, L-55-569 "fish-eye" lens.

Figure 3:
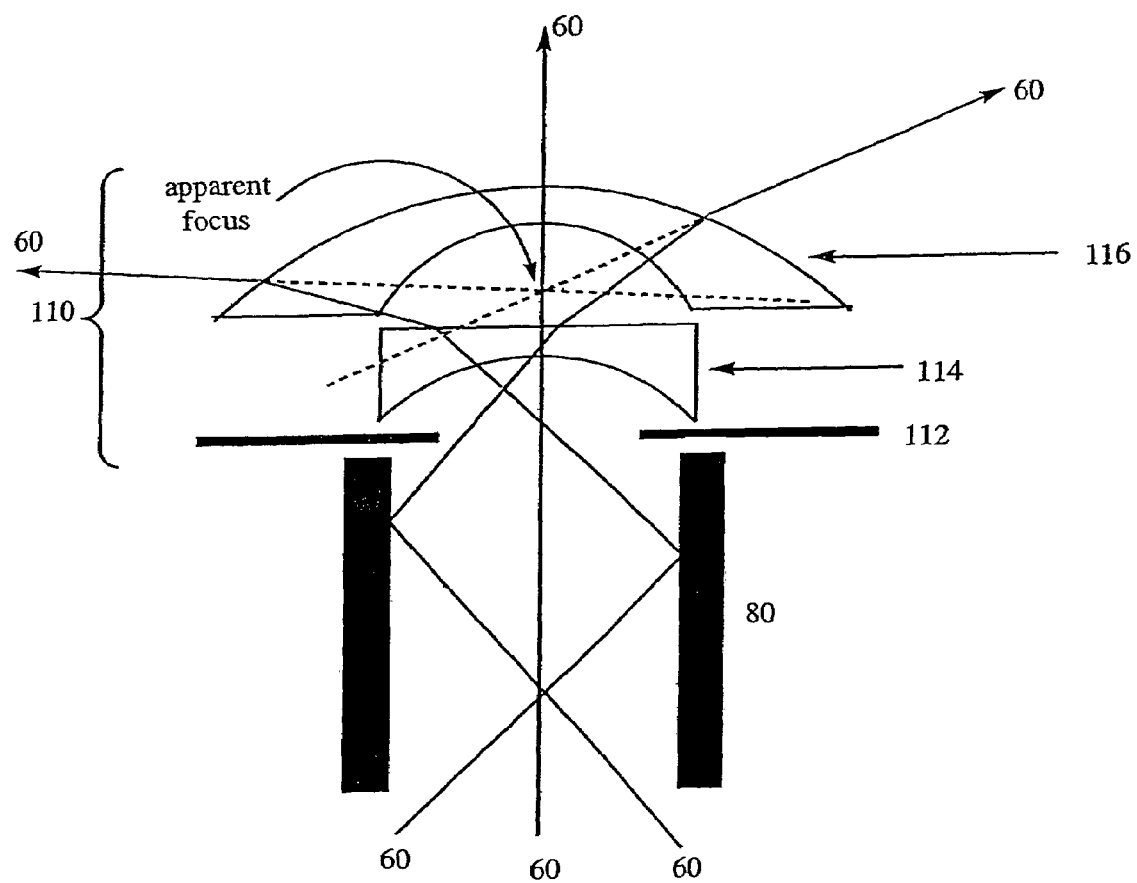
FIG. 3 is a schematic drawing of a light dispersing lens assembly comprising a fish-eye lens, a concave lens and an aperture.

As depicted in FIG. 3, an incident cone of light having a cone angle θ=90° passes through the light diffusing lens assembly 110 comprising a convex lens 114 and a wide-angle lens 116 such that the light exiting the lens assembly 110 has a cone angle θ' which is greater than θ, the cone angle of the incident cone of light. Typically, the departing cone of light has a cone angle θ' of at least about 150°, preferably θ' is at least about 160°, 170°, 175° or more. Particularly preferred departing cones of light have a cone angle θ' of about 180°.

In preferred planetarium projectors of the invention, the light conducting conduit is disposed relative to the light dispersing lens assembly such that light exiting the conduit is uniformly dispersed by the lens assembly with homogenous light intensity over a cone of at least about 160°, about 165°, about 170°, about 175° or about 180°. In particularly preferred embodiments the light exiting the conduit is uniformly dispersed by the lens assembly with homogenous light intensity over a cone of about 180°, e.g., over a hemisphere.

The light diffusing lens assembly (also referred to herein as a wide angle lens assembly) is preferably disposed at the distal end of the light-conducting conduit 80. Preferred wide-angle lens assemblies suitable for use in devices of the invention include those having one or more lenses or other optical elements capable of dispersing light, which are capable of uniformly dispersing light from a point source. More preferably, wide-angle lens assemblies suitable for use in the planetariums of the invention include those wherein the lens assembly is capable of dispersing cone of light passing through the second focus 64 or exiting the distal end of the light conducting conduit in a cone of about 90° to about a 180° cone of light where the light intensity of the light cone is substantially uniform.

Figure 2:
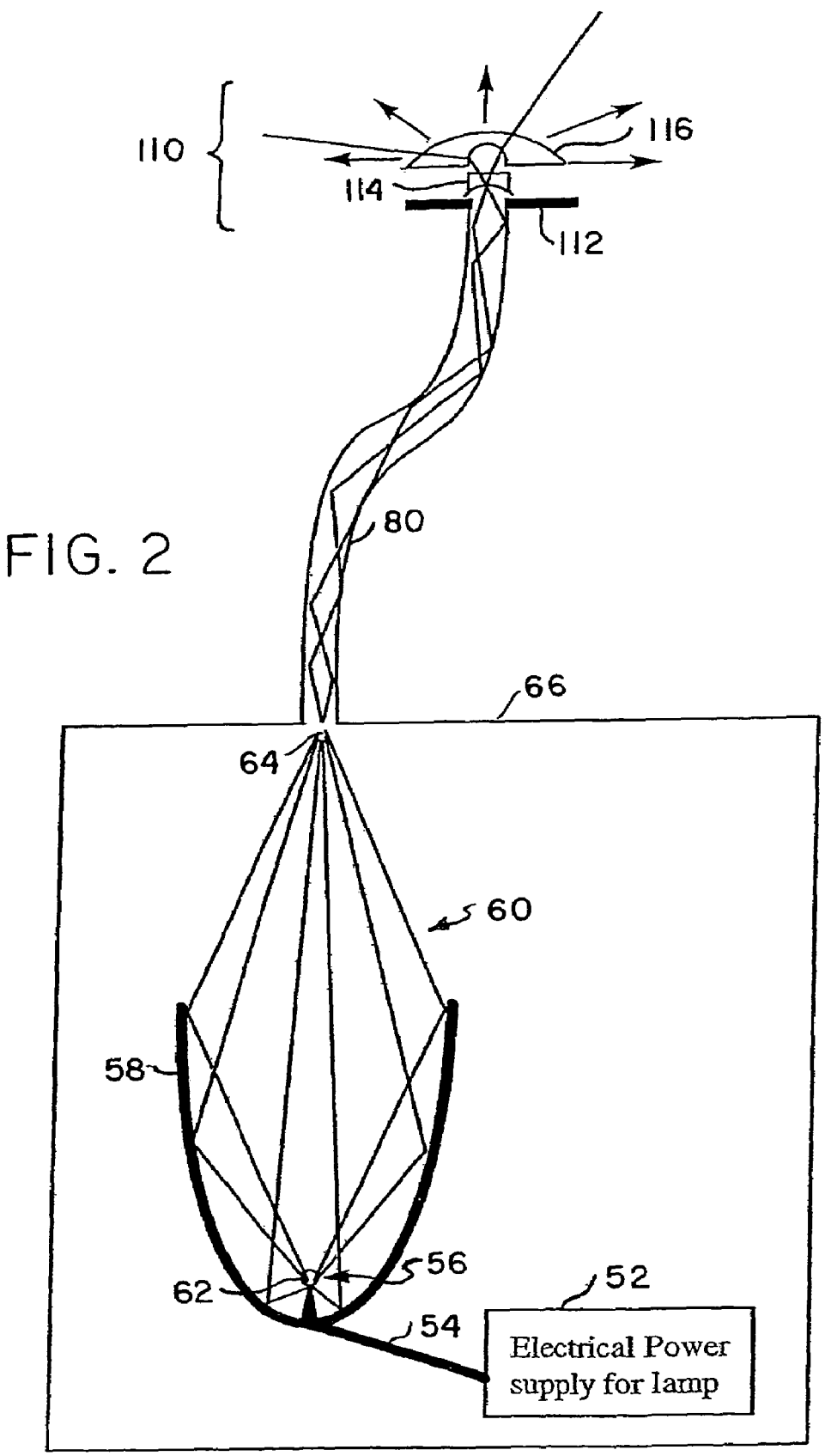
FIG. 2 is a schematic drawing illustrating the bending of light passing through a light dispersing lens assembly of the invention.

As depicted in FIG. 2 and FIG. 3, certain preferred light dispersing assemblies further comprise one or more aperture reduction irises, 112. Preferred aperture reduction irises include mechanically adjustable irises, including manually operated mechanical irises and electronically operated mechanical irises, and piezoelectric irises in which application of an electric field induces a transparent to opaque transition in part of the aperture or in the entire aperture of the reduction iris. Preferred aperture reducing irises suitable for use in the invention may be dilated to permit all of the light from the point light source to pass through the light dispersing lens assembly or the reducing iris may be constricted to vary the portion of light impacting the iris which is transmitted to the light dispersing lens assembly.

A preferred light dispersing lens assembly 110 suitable for use in planetarium projectors of the invention is provided by FIG. 1 and FIG. 2. Preferred lens assembly 110 comprises a wide-angle lens 116, e.g., a fish-eye lens, a concave lens 114, and a reduction iris 112 possessing a variable diameter aperture. The reduction iris 112 is disposed adjacent to the distal end of the light-conducting conduit 80 and the concave lens 114 is disposed between the reduction iris 112 and the fish-eye lens 116.

As depicted in FIG. 3, in certain planetarium projectors of the invention the diameter of the reduction iris aperture is less than the diameter of the light-conducting conduit 80 such that the apparent cross-section of the point light source is less than the actual size of the arc lamp 56 generating the point light source. The light, which exits the light conducting conduit 80 and passes through the aperture of the reduction iris 112, is dispersed in a cone having a cone angle of about 90° with substantially uniform light intensity throughout a cross-section of the light cone. Said cone of light having a cone angle of about 90° impacts the concave face of the concave lens 114 such that the light entering the concave lens is spread to a new cone of light having a cone angle of greater than about 90°.

In a preferred embodiment of the invention, wide-angle video cameras are suitable for use in the present invention where the video camera lens functions as the "fish-eye" lens or lens assembly and the iris of the camera functions as the aperture. In particularly preferred embodiments having a video camera as the light spreading lens assembly and aperture, the iris of the camera functions as the are wide angle lens assembly and the aperture of the iris can be modulated. Preferred variable irises are modulated by an electrical or mechanical actuator.

Variable diameter iris actuated by a mechanical or electrical mechanism. Typically electrically actuated irises are preferred for use in the planetariums of the invention. The diameter of the aperture of the iris can be increased to generate brighter star images which less clarity, where the aperture defines an apparent point light source of about 1 mm, 0.75 mm, or about 0.5 mm. The diameter of the iris aperture can be decreased to form sharper, but less bright, star images where the aperture defines an apparent point light source of about 0.4 mm, 0.3 mm, 0.2 mm, 0.1 mm, 0.05 mm or less. Typically, fixed apertures, e.g., apertures having a fixed diameter, are between about 0.05 mm and about 0.5 mm, more preferably between about 0.1 mm and about 0.4 mm.

The light dispersing lens assembly is housed within an enclosure having opaque and transparent domains. Preferred enclosures include hemispherical and cylindirical enclosures. Particularly preferred enclosures include cylindrical enclosures provided by U.S. Pat. No. 4,178,701.

The enclosure has disposed therein the distal end of the light-transporting element and the lens or lens assembly for dispersing the light exiting the lens or lens assembly. Light dispersed by the lens or lens assembly strikes the interior surface of the enclosure such that only light contacting the holes or lenses of the enclosure traverse the enclosure. Light exiting the enclosure by passing through holes or lenses is projected upon a curved viewing surface where light passing through each hole or lens is projected as an individual star.

Preferred enclosures may be reversibly attached to a light dispersing lens assembly. The light dispersing lens assembly and the enclosure, taken in combination, may form an integrated assembly. Typically the components of the light dispersing assembly are mounted on a support structure or other rigid object (not shown in the Figures). In preferred embodiments, the planetarium projectors of the invention comprise an interchangeable enclosure which may be reversibly attached to the support structure. Typically complimentary coupling elements are used to affix an enclosure to the light dispersing lens assembly such that one or more interchangeable enclosures suitable for use with planetariums of the invention may be reversibly attached to the light dispersing assembly by attaching or coupling the complimentary coupling elements. Preferred coupling elements suitable for use in the planetariums of the invention are not particularly limited and may include screw threading, tongue and grove alignments, mortise and tendon joints, or mechanical fasteners such as hasps, clasps, pins, clips, screws and the like. In general, any common mechanism suitable for holding two or more objects in a static relationship to each other is suitable for use in the devices of the invention.

The images generated by the projection assembly may be viewed on any surface. However, preferred viewing surfaces are generally curved, more preferred viewing surfaces are concave surfaces such as the interior of a portion of a sphere. Particularly preferred viewing surfaces include the interior surface of hemispheres corresponding to a sphere having a diameter at least twice the diameter of the spherical enclosure 120 of the projector assembly. Especially preferred viewing surfaces are hemispherical surfaces defined by a sphere with a center point substantially coincident to the center point of the sphere defining the curvature of the spherical enclosure 120.

Preferred planetarium projectors of the invention include those wherein the point light source, the light dispersing lens assembly, and the enclosure are each mounted in a common housing which is sufficiently small and light to permit transport by one or two operators, more preferably by a single operator. Preferred planetarium projectors of the invention that are mounted in a common housing may further comprise a light conducting conduit disposed between the ping light source and the light dispersing lens assembly to facilitate mounting the components in the common housing or to improve the homogeneity of the cone of light impinging upon the light dispersing lens assembly.

In other particularly preferred embodiments, the planetariums comprises two discrete housings connected during operation of the planetarium by a light conducting conduit. A first housing comprises the power supply, a point light source, and a coupling suitable for connecting a proximal end of the light conducting conduit to the first housing such that at least a portion of light generated by the point light source enters into the light conducting conduit.

Although preferred embodiments of the invention have been described using specific terms, such description is for illustrative purposes only, and it is to be understood that changes and variations may be made without departing from the spirit or scope of the following claims.

What is claimed is:

1. A planetarium projector comprising:
   a point light source having substantially symmetric light intensity and an apparent cross-section of less than about 2 mm which is capable of generating a beam of high-intensity light having a cone angle $\theta$;
   an enclosure having opaque regions and transparent regions that correspond to locations of individual celestial stars, wherein the enclosure includes an inner surface and an outer surface; and
   a light dispersing lens assembly disposed within the enclosure such that the beam of light having a cone angle $\theta$ from the point light source enters the light dispersing lens assembly and a beam of light having a cone angle $\theta'$ exits the light dispersing lens assembly wherein $\theta<\theta'$ and the beam of light exiting said light dispersing lens assembly fully illuminates the inner surface of said enclosure.

2. A planetarium projector of claim 1, which further comprises an elliptical mirror, a dual paraboloid reflector system, a lens, or a combination thereof, wherein the point light source is situated at a first focus of the elliptical mirror, dual paraboloid reflector system, lens or a combination thereof such that a substantial portion of the light generated by the point light source is concentrated at a second focus of the elliptical mirror, dual paraboloid reflector system, or lens.

3. A planetarium projector of claim 2, further comprising a light-conducting conduit which is interposed between the point light source and the light dispersing lens assembly such that a proximal end of the light-conducting conduit is disposed at the second focus of the elliptical mirror, dual paraboloid reflector system, lens or combination thereof and a distal end of the light-conducting conduit is disposed adjacent to the light dispersing lens assembly.

4. A planetarium projector of claim 3, wherein substantially all of the beam of light from the point light source which enters into the light dispersing lens assembly passes through the light-conducting conduit.

5. A planetarium projector of claim 2, further comprising a light-conducting conduit which is interposed between the point light source and the light dispersing lens assembly having a proximal end of the light-conducting conduit is situated at the second focus of the elliptical mirror or the dual paraboloid reflector system and a distal end of the light-conducting conduit is adjacent to the light dispersing lens assembly such that light directed to the second focus of the elliptical mirror or dual paraboloid reflector system is conducted by the light conducting conduit to the light dispersing lens assembly situated at the distal end of the light-conducting conduit.

6. A planetarium projector of claim 3 or 5, wherein the light-conducting conduit is a fiber optic cable, a bundle of fiber optic cables or a coherent optical bundle.

7. A planetarium projector of claim 1, wherein the beam of light having a cone angle θ has a substantially uniform intensity throughout the cross-section of the beam of light.

8. A planetarium projector of any one of claim 1, 2, or 5 further comprising a variable diameter aperture interposed between the point light source and the light dispersing lens assembly such that the apparent size of the point light source may be varied by modulating the diameter of the variable diameter aperture.

9. A planetarium projector of claim 1 wherein the light dispersing lens assembly comprises at least one optical element capable of dispersing an incident beam of light.

10. A planetarium projector of claim 9, wherein the light dispersing lens assembly comprises at least one fish eye lens, one divergent gradient index lens or one parabolic concentrator.

11. A planetarium projector of claim 1, wherein the apparent cross-section of the point light source is less than about 1.0 mm.

12. A planetarium projector of claim 1, wherein the apparent cross-section of the point light source is less than about 0.5 mm.

13. A planetarium projector of claim 1, wherein the apparent cross-section of the point light source is less than about 0.25 mm.

14. A planetarium projector of claim 1, wherein the point light source generates at least 250 lumens of light.

15. A planetarium projector of claim 1, wherein the point light source generates at least 500 lumens of light, and wherein the apparent cross-section of the point light source is less than about 0.5 mm.

16. A planetarium projector comprising:

a point light source having substantially symmetric light intensity and an apparent cross-section of less than about 0.5 mm which is capable of generating a beam of high-intensity beam light having a cone angle θ;

an elliptical mirror or a dual paraboloid reflector system, wherein the point light source is situated at a first focus of the elliptical mirror or the dual paraboloid reflector system such that a substantial portion of the light generated by the point light source is concentrated at a second focus of the elliptical mirror or the dual paraboloid reflector system;

an enclosure having opaque regions and transparent regions that correspond to locations of individual celestial stars, wherein the enclosure includes an inner surface and an outer surface;

a light dispersing lens assembly disposed within the enclosure such that the beam of light having a cone angle e from the point light source enters the light dispersing lens assembly and a beam of light having a cone angle θ exits the light dispersing lens assembly wherein θ<θ' and the beam of light exiting said light dispersing lens assembly fully illuminates the inner surface of said enclosure; and a light-conducting conduit which is interposed between the point light source and the light dispersing lens assembly such that a proximal end of the light-conducting conduit is disposed at the second focus of the elliptical mirror or the dual paraboloid reflector system and a distal end of the light-conducting conduit is disposed adjacent to the light dispersing lens assembly such that substantially all of the light from the point light source which enters into the light dispersing lens assembly passes through the light-conducting conduit.

17. A planetarium projector of claim 16, wherein the light dispersing lens assembly comprises at least one fish eye lens, one divergent gradient index lens or one parabolic concentrator.

* * * * *